June 13, 1939. H. B. KASTER 2,162,582
DEVICE AND METHOD FOR DETERMINING UPPER AIR WIND DIRECTION AND VELOCITY
Filed Dec. 10, 1936 2 Sheets-Sheet 1

INVENTOR.
HOWARD B. KASTER
BY
ATTORNEY.

Patented June 13, 1939

2,162,582

UNITED STATES PATENT OFFICE 2,162,582

DEVICE AND METHOD FOR DETERMINING UPPER AIR WIND DIRECTION AND VELOCITY

Howard B. Kaster, Alameda, Calif.

Application December 10, 1936, Serial No. 115,260

10 Claims. (Cl. 33—67)

The invention relates to devices for determining the velocity and direction of wind or air currents at various altitudes over the surface of the earth.

As will be readily understood the determination of wind velocity and direction at various altitudes over the surface of the earth is of great importance. Such information is used, for example, in the study and prediction of weather conditions and is of particular and important advantage to commercial and private air traffic. It is not infrequent that throughout a range of a few thousand feet difference in altitude, the air currents will vary very considerably in both direction and velocity. Thus an airplane traveling, for example, at one elevation may be subjected to severe head winds or cross air currents, whereas at a different elevation the pilot could take advantage of a tail-wind which would facilitate traveling, as well as materially reduce fuel consumption, etc. Other than this, there are occasions when it is not safe for a pilot to land at one station due to fog, or the like, and yet a reduced fuel supply will make hazardous the proceeding to the next station unless the pilot can be assured of favorable winds, or at least, the avoidance of severe head or cross winds. With accurate information on air current conditions, the pilot would generally have little difficulty in proceeding on to the next station where a safe landing may be made.

As important as it is to have accurate knowledge of wind conditions, for the reasons above pointed out and others, there is at present an insufficient amount of data being obtained on this potentially great source of assistance. This is due, primarily to the fact, that the apparatus for measuring and plotting air currents which has been heretofore available is expensive and has required the services of highly trained observers. The meager data which has been available on air currents at different locations is usually based on measurements taken other than when needed, and which, for that reason, are in all likelihood undependable. It must be borne in mind that due to frequent changes in air currents, it is of primary importance, if knowledge of such currents is to be advantageously used, that the measurements be taken at the time of the flight and at many points along the air-way.

In accordance with the present invention, and as a principal object thereof, I have provided a device for determining wind direction and velocity at various altitudes which may be simply and expeditiously used without requiring a technically trained observer or the full time service of the observer, but, on the contrary, the device may be operated if desired by any of the airport attendants without seriously interfering with his other duties. The present device is designed to afford a trigonometrical graphic solution of the variables of altitude, horizontal velocity and direction wherein all mathematical computations have been eliminated and the aforesaid variables readily determined by merely making periodic observations on a pilot balloon and charting the movement of said balloon as the position of the same is automatically resolved through a system of similar triangles established by the instrument. In this manner, no particular training or skill is required in the use of the instrument and but an instant is required for taking and recording the direct readings of data desired, without the use of auxiliary mathematical tables or computations.

Another object of the invention is to provide a device of the character described which though used by an unskilled observer, will, by reason of the automatic mechanical graphic determinations made by the device, produce results which will be less likely to be in error than those heretofore arrived at by a series of mathematical computations.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to said drawings.

Figure 1:
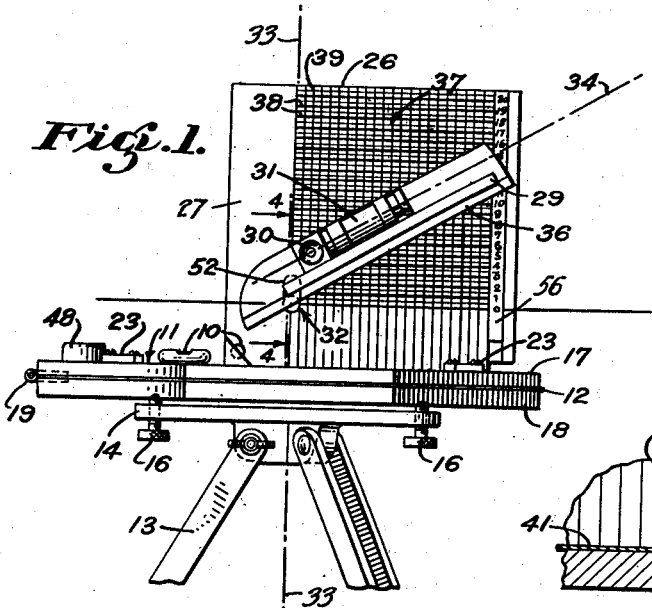
Figure 1 is a side elevation of a device constructed in accordance with the present invention.
Figure 6:
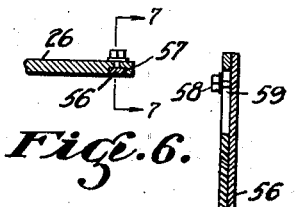
Figure 6 is a fragmentary transverse sectional view of an adjustable indicia means used on a quadrant used for indicating various altitudes on a quadrant plate forming part of the present device.
Figure 7:
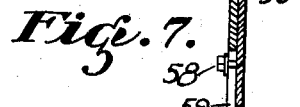
Figure 7 is a vertical sectional view of the part shown in Figure 6 and is taken substantially on the plane of line 7—7 of Figure 6 and rotated 90° to show the actual vertical position.
Figure 3:
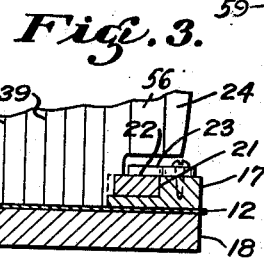
Figure 3 is a fragmentary vertical sectional view of a part of the apparatus and is taken substantially on the plane of line 3—3 of Figure 2.
Figure 2:
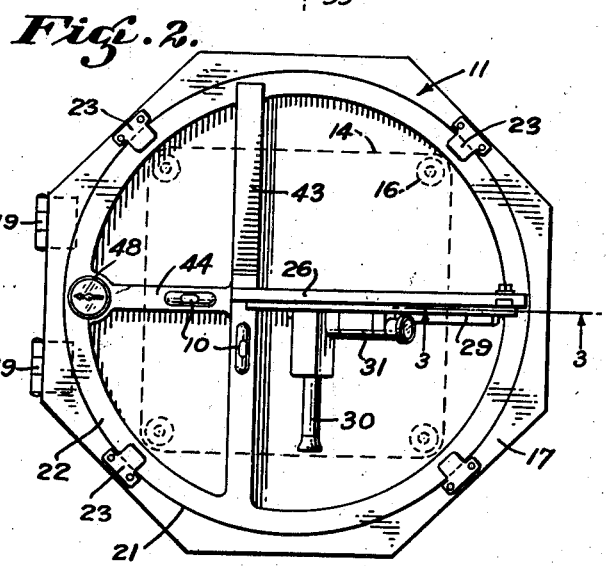
Figure 2 is a plan view of the device illustrated in Figure 1 minus some details shown in other figures.

The apparatus and method of the present invention for determining wind direction and velocity in the upper air space involve the use of a relatively small pilot balloon or the like which may be released from the ground or point of observation or other point of known elevation, and which has a known rate of ascension and is propelled by wind or other air current. Following the release of the balloon, observations are made of the balloon at predetermined intervals from which intervals, and rate of ascension of the balloon, the altitude of the balloon at the time of observation becomes known. These observations are generally made from a common reference point although they may be made from a plurality of spaced points as when taken from a ship, aircraft or vehicle having a known course and velocity of movement so as in either event to establish a plurality of lines of sight on the balloon. A point is then taken on each of such lines of sight, adjacent the instrument, but at an elevation on the line proportional to the elevation of the balloon and these points are projected vertically on to a horizontal plane to indicate on a reduced scale, the horizontal components of the balloon's position at each of such observations. This method is illustrated in a trigonometrical representation in Figure 8 wherein two balloon positions are indicated at $P_1$ and $P_2$ relative to the space coordinates X, Y, and Z. Assuming that a common point of observation of the two balloon positions is at O, the lines of sight on the balloon's positions will be indicated by the lines $OP_1$ and $OP_2$. If positions $P_1$ and $P_2$ are projected vertically to the horizontal plane of $Y=0$, namely the X—Z plane, the points $X_1Z_1$ and $X_2Z_2$ will represent the relative horizontal positions of $P_1$ and $P_2$. Now, if a line is drawn from O to $X_1Z_1$, this line will indicate the average horizontal length and average horizontal direction of movement of the balloon in ascending from O to $P_1$. The interval of time taken by the balloon to ascend from O to $P_1$ being known, the length of line $O(X_1Z_1)$ divided by said time will give the average horizontal wind velocity between the elevations O and $Y_1$ corresponding to $P_1$. Similarly the line $O(X_1Z_1)$ will represent the average direction of wind movement between elevations O and $Y_1$. At a second interval the position of the balloon at $P_2$ is observed, thus establishing a second line of sight $OP_2$. Projection of position $P_2$ on to the horizontal plane $Y=0$ provides the location of point $X_2Z_2$ or the horizontal components of the position $P_2$. Now, if a line be drawn between $X_1Z_1$ and $X_2Z_2$, this line will represent the horizontal movement of the balloon in moving from the position $P_1$ to position $P_2$. Again the length of line $(X_1Z_1)(X_2Z_2)$ divided by the time taken by the balloon to pass from position $P_1$ to position $P_2$ will give the average horizontal wind velocity between the elevations $Y_1$ and $Y_2$, the point $Y_2$ corresponding to the elevation of the point $P_2$. Similarly, the direction of line $(X_1Z_1)(X_2Z_2)$ indicates the direction of the horizontal air currents between the elevations $Y_1$ and $Y_2$.

To reduce the relatively large distance between positions $P_1$ and $P_2$ and the various other positions above mentioned, to a workable size, the present method operates through a system of similar triangles to enable the ready plotting of the horizontal points $X_1Z_1$ and $X_2Z_2$ in their true length and angularity but on a reduced scale where their values may be accurately measured and determined. This is effected by selecting elevations $Y_1'$ and $Y_2'$ on the instrument and adjacent the reference point O and which elevations are proportional to the true elevations $Y_1$ and $Y_2$ of the balloon's positions $P_1$ and $P_2$. On observing the first balloon position $P_1$ and establishing the line of sight $OP_1$, the operator projects from the elevations $Y_1'$ horizontally to the line of sight to locate the point $P_1'$ thereon. This point is then projected vertically on to a horizontal plane to locate the point $X_1'Z_1'$. Since the line $OP_1'$ is with the line $OP_1$, the line $O(X_1'Z_1')$ will be coincident with the line $O(X_1Z_1)$. Further, since the line $P_1'(X_1'Z_1')$ is proportional to the line $P_1(X_1Z_1)$, the line $O(X_1'Z_1')$ will be proportional in length to the line $O(X_1Z_1)$. Thus, the point $X_1'Z_1'$ represents, on a reduced scale, the true horizontal position of the point $P_1$ and the line $O(X_1'Z_1')$ therefore represents, on a similarly reduced scale, the direction and average horizontal component of travel of the balloon due to air currents between the elevations O and $Y_1$. Similarly, by projection of the point $Y_2'$ horizontally to the point $P_2'$ on the line of sight $OP_2$ and then projecting the point $P_2'$ vertically on to the horizontal plane $Y=0$, the point $X_2'Z_2'$ is established, and, as in the case of point $X_1'Z_1'$, the point $X_2'Z_2'$ represents, on a reduced scale, the true horizontal position of the point $P_2$. Now the line $(X_1'Z_1')(X_2'Z_2')$ will represent, on a reduced scale, the true average horizontal length of movement and direction of movement of the balloon in moving from position $P_1$ to position $P_2$. By standardizing the rate of ascension of the balloon and the interval of observation and the difference in length between the spacings $O-Y_1'$ and $O-Y_2'$, as will be more fully hereinafter set forth, the length of lines $O(X_1'Z_1')$ and $(X_1'Z_1')(X_2'Z_2')$ may be read directly in terms of velocity. A typical chart made with the method and apparatus of the present invention has been illustrated in Figure 5 of the drawings which shows the results of plotting a series of points as $X_1'Z_1'$, $X_2'Z_2'$, etc., to indicate the velocity and wind direction of elevations up to some ten thousand feet.

Figure 8:
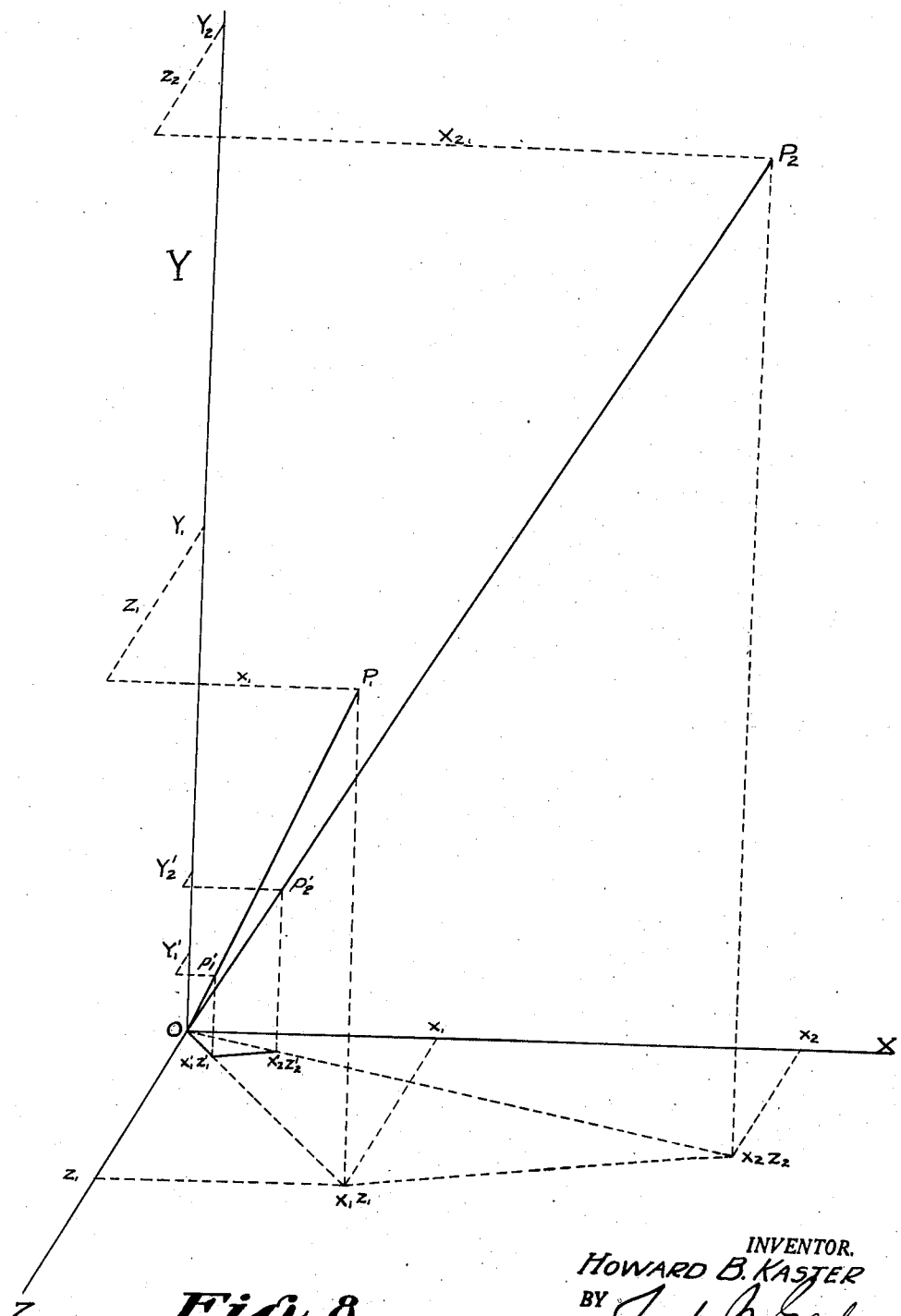
Figure 8 is a trigonometrical representation of the method of the present invention.

The apparatus of the present invention for carrying out the method above explained is illustrated in Figures 1 to 7 of the drawings and consists of a horizontal plotting table or support 11 which with reference to Figure 8 is parallel to the plane of $Y=0$, and on which is mounted a vertical axis 33 corresponding to the Y axis of Figure 8 so that on rotation of the quadrant the same may be caused to lie in the plane of triangle $OP_1'X_1'Z_1'$ or triangle $OP_2'X_2'Z_2'$. Mounted on the quadrant is an observation unit such as a telescope 31, or the like, and which is pivoted to the quadrant along a horizontal axis intersecting a line parallel to the line of sight of the unit and intersecting the point O of Figure 8. Also provided on the quadrant is a set of rectangular coordinates 37 the abscissae 38 of which are spaced vertically by distances proportional to the elevations of the balloon to be observed and correspond with the points $Y_1'$ and $Y_2'$ of Figure 8. On the other hand, the ordinates 39 extend vertically to the plotting surface of support 11 so as to facilitate the vertical projection of the points $P_1'$ and $P_2'$, etc., on to the plotting surface to locate the points $X_1'Z_1'$ and $X_2'Z_2'$, etc. Thus, on sighting the balloon at elevation $P_1$ the operator follows the abscissa on the quadrant corresponding to $Y_1$ to the line corresponding to the parallel line of sight of the unit, to locate the point $P_1'$ and then follows the vertical intersecting ordinate to the plotting surface to locate a point corresponding to $X_1'Z_1'$. Similarly on sighting the balloon on position $P_2$ the operator follows the abscissa $Y_2'$ to the line corresponding to the line of sight and then vertically to the plotting surface to locate a point corresponding to $X_2'Z_2'$. In this manner the operator is simply required to locate and mark a plurality of points such as $X_1'Z_1'$ and $X_2'Z_2'$ on the plotting surface and to connect these points with straight lines to obtain a graphic solution of the average wind direction and velocity between different altitudes.

More specifically the table or support 11 is adapted for horizontal positioning preferably with the assistance of spirit levels 10, and is arranged for the receipt of a sheet 12, of paper or the like, on which the movement of the balloon may be charted. The table supporting means may be any form suitable and convenient at the place of observation and, as here shown, consists of a tripod 13 having a supporting plate 14, which is fixed to the table by means of a set of leveling screws 16. Where the installation is to be of a permanent nature the tripod may be dispensed with in favor of a more permanent type of supporting unit.

The table 11 is composed of upper and lower sections 17 and 18 which are secured at a side by means of a hinge 19 for vertical separation and the receipt of a sheet 12 therebetween. The lower section 18 is provided with a plain surface for the uninterrupted support of the sheet 12, while the upper section 17 is in the form of a rim which rests on section 18 adjacent the latter's periphery and is substantially open over its center portion to expose the sheet 12. Formed on the radially inner side of the section 17 is an annular seat 21 which is adapted to rotatably receive an annulus or ring member 22, the latter being held against vertical removal from the seat by means of a plurality of circumferentially spaced guards 23, and being adapted to support for rotation relative to the table, the quadrant 26 and observation unit. The quadrant is provided with a surface 27 in substantially a vertical plane and on which is mounted by means of an arm 29 the telescope 31, the latter being preferably provided with a right angle eye-piece 30.

For mechanical reasons a straight edge 36 on the arm is used for projection instead of the line of sight of the telescope. Such edge is arranged adjacent and parallel to said line of sight and by reason of its proximity and parallelism and the relatively great distance of the balloon the error thus introduced is entirely negligible. To pivotally secure this straight edge to the quadrant about a horizontal axis intersecting the vertical axis of rotation 33 of the quadrant as above indicated, the arm may be provided with a pin 32 which, as here shown, is arranged with the axis of rotation thereof intersecting said edge and is extended through the quadrant and is journaled in a backing plate 53, the latter being secured to the quadrant by screws 54. The straight edge co-operates as above described with the rectangular coordinates 37 provided on the quadrant surface 27 for resolving onto the horizontal plotting sheet 12, the horizontal components of different elevations, along said straight edge, corresponding to the elevation of the balloon at the time of observation. Also as above described, a series of vertically spaced abscissae 38 are used to represent the various elevations of the balloon at which a series of observations are made and preferably the ordinates 39 are extended to adjacent the bottom 41 of the quadrant, see Figure 3, for projection to the plotting sheet of the intersection of said elevation abscissae and the straight edge 36. An indicia strip 56 is carried by the quadrant and is provided with a series of numbers such as 0 to 20 opposite the abscissae 38 to identify the abscissae which are used for plotting the balloon positions at different altitudes up to 20,000 feet in altitude. Since the balloon altitude is computed from the rate of ascension of the balloon and time between observations, the scale on the indicia member 56 may be calibrated, if so desired, directly in units of time or where the time interval is fixed, the number of observations.

Figure 5:
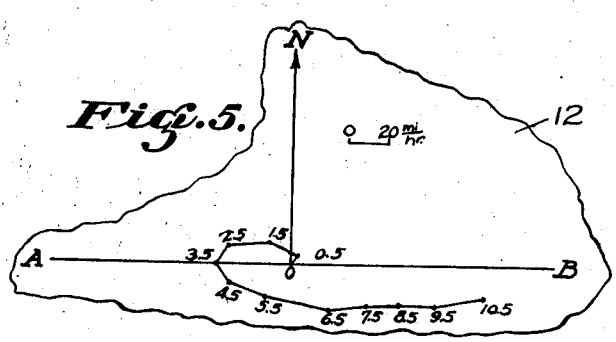
Figure 5 is a plan view of the recording sheet used in connection with the present invention and with the data plotted thereon.

In order to eliminate all mathematical computations the device is preferably standardized so that the length of the lines plotted may be read directly in terms of velocity. Such a standardization may be effected as follows. A balloon is selected which has a known ascension rate, say for example, one having an average ascension rate of 180 meters per minute or approximately 590 feet per minute. This ascension rate varies somewhat with altitude but the use of an average rate affords results having an accuracy better than ordinary airplane altitude meters. In order to substantially compensate for this variance in ascension rate, I use a time interval between observations of 1 minute and 40 seconds to represent each 1000 foot difference in elevation of the balloon and start the balloon approximately 5 seconds after start of observation time. Next a convenient plotting scale on the sheet 12 is selected such as say one inch to equal 20 miles an hour wind speed. In accordance with this scale, the spacing of the abscissae 38 representing 1000 foot intervals is 0.341 inch. This is arrived at as follows.

$$1 \text{ in.} = 20 \text{ mi. per hr.} = \frac{20 \times 5280}{60 \times 60} \text{ ft. per sec.}$$
$$= 29.33 \text{ ft. per sec.}$$

then 1 in.=2933 ft. for 100 sec. corresponding to 1000 ft. rise of balloon in 1 minute and 40 seconds or 0.341 in.=1000 ft. Preferably the first observation is made after approximately 50 seconds when the balloon will be above the frequently erratic surface winds and to determine the average wind velocity adjacent the surface or up to approximately 500 feet. At this time the telescope is sighted on the balloon and the operator then follows the 500 foot abscissa across to the straight edge 36 and then follows the intersecting ordinate down to the surface of the plotting sheet where a mark is placed. This mark is indicated by numeral 0.5 on the plotting sheet illustrated in Figure 5. The operator then draws a line from the axis of rotation of the quadrant or 0 to point 0.5 to indicate the average velocity and direction of wind movement between the surface and approximately 500 feet. Preferably in order to obtain average wind velocities in increments of one thousand feet of altitude the second and following observations are made at intervals of 1 minute and 40 seconds after the first observation. Thus at the end of 2 minutes and 30 seconds the operator makes a second observation on the balloon when the same is at approximately 1500 feet and follows the 1.5 abscissa across to the straight edge 36 and then down to the plotting sheet where the point is marked as observation 1.5, as illustrated in Figure 5. By drawing a line between points 0.5 and 1.5 the operator will have immediately the average direction and velocity of the wind between approximately 500 or 1500 feet and at approximately 1000 feet. By continuing such observations of the balloon periodically at intervals of 1 minute and 40 seconds and charting the succeeding positions of the balloon from abscissae 2.5, 3.5, 4.5, 5.5, etc., see Figure 5, the velocity and direction of the wind may be readily ascertained for altitudes as high as the balloon may be observed, and which may extend on clear days to upwards of 20,000 feet.

It is preferable where relatively high velocity winds are present particularly at lower altitudes to use a scale of something more than 20 miles an hour to the inch. This may be done by using a proportional auxiliary scale on the quadrant or without the use of such scale the horizontal velocity may be conveniently doubled on present scale by doubling the indicated vertical scale.

The rotatable ring 22 is preferably provided with a pair of cross members 43 and 44 serving as braces and the ring is further preferably provided with a magnetic compass 48 so that the quadrant may be aligned with the north and south or east and west directions or with the direction of travel of the air-line or the like, in connection with which the data is to be used and reference lines placed on the charting sheet. If desired, where the installation is of a permanent nature, the charting sheets may be printed with the principal directions of air travel. For example, with reference to Figure 5, assume that the line A—B indicates the direction of travel of the traffic through the point of observation. Accordingly, planes traveling in the direction from B to A would find a most favorable wind of approximately 21 miles an hour between the 1500 and 2500 foot levels or say, at 1000 feet. On the other hand, planes traveling in the direction from A to B would find a most favorable wind of about 32 miles an hour at about 6000 feet. Also, as will be apparent, if the planes should be in reversed elevations they would each have a fairly strong head wind instead of a favorable tail wind and should either of the planes be between 2500 and 4500 feet they would encounter a relatively stiff cross wind.

The chart here illustrated in Figure 5 represents a plurality of observations from a common reference point. Observations may be made from a moving reference point as from a ship or the like having a known course and velocity of movement by adding vectorally to the observed charted position of the balloon, the movement of the ship.

Figure 4:
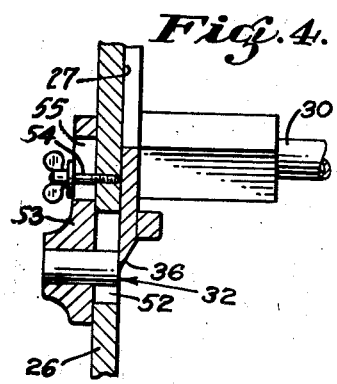
Figure 4 is a fragmentary vertical sectional view of a part of the apparatus and is taken substantially on the plane of line 4—4 of Figure 1.

The apparatus may be readily calibrated for reading wind velocity and direction at various altitudes over the elevation of the point of observation or over sea-level. Preferably the apparatus is calibrated for sea-level, and is adjustable for adapting same to other elevations by moving the pivotal connection 32 of the observation unit vertically in accordance with the variation in elevation of the point of observation. This is here effected, as shown in Figure 4, by the mounting of the pin 32, serving to pivotally connect the arm and quadrant, through a vertical slot 52 in the quadrant and at the same time providing vertical slots 55 in the plate 53 for receipt of the screws 54 whereby the backing plate and the observation unit may be shifted vertically with respect to the quadrant.

Preferably, the indicia strip 56 is carried in a vertical groove or recess 57 so as to enable a vertical adjustment of the strip relative to the abscissae of the quadrant plate. Thus in adjusting the device for operation at altitudes above sea-level it is only necessary to shift the pivotal connection of the observation until sufficiently to compensate for the nearest 100 feet, and the strip 56 may be adjusted to compensation for the nearest 1000 feet. For example, if the device is to be installed in a station having an elevation of 1200 feet, the strip 56 may be lowered to position the numeral 1 opposite the lowermost abscissa and the pivotal connection 32 then elevated 0.2 of the distance between the abscissae 1 and 2. Suitable markings may be placed on the quadrant opposite the pivotal connection for facilitating this latter adjustment. Screws 58 carried by the strip and mounted through slots 59 in the quadrant may be used to effect an adjustment of the strip.

I claim:

1. In a unitary device for determining wind direction and velocity at various elevations and adapted for use with a balloon having a known rate of ascension, means for observing said balloon and establishing a line of sight thereon during the ascension, means providing a charting area, and means comprising a revolvable device providing rectangular coordinates for resolving the horizontal component of said line of sight at different elevations thereon and the horizontal angular displacement of said line on to said area.

2. In a device for determining wind direction and velocity at various elevations and adapted for use with a balloon having a known rate of ascension, means providing a plane, sighting means pivotally mounted for movement in a plane at right angles to said first plane, said pivotally mounted means being revolvable in a plane parallel to said first plane, means separated proportionally to the rate of ascension of said balloon, projectable upon the line of sight of said sighting means in different positions thereof and upon said first plane, to resolve the travel of said balloon into its velocity and angular position components, parallel to said first plane.

3. The method of determining wind direction and velocity at different elevations which consists in sighting at regular intervals, from an established point, the path of a pilot balloon rising substantially at a constant rate and propelled by said wind, intersecting said line of sight by one of a plurality of horizontal lines spaced proportionally to said rate of rise, projecting said intersection upon a horizontal plane and recording the projection of said intersection, whereby the horizontal velocity and angular direction of said wind are determined.

4. The method of determining wind direction and velocity between different known elevations which consists in observing a pilot balloon having a known rate of ascension at said elevations to establish lines of sight thereon at said elevations, locating points on said lines of sight at elevations proportional to said balloon elevations, and projecting said last named points vertically on to a horizontal plane.

5. A device for determining upper air currents comprising, a table adapted for horizontal positioning, an upright member rotatably mounted on said table about a vertical axis and provided with a surface in a vertical plane, sighting means mounted on said surface and pivoted thereto about a horizontal axis, and means for adjusting the elevation of said horizontal axis of said sighting means relative to said surface.

6. A unitary device for determining wind velocities and direction at various elevations comprising, a table adapted for horizontal positioning and provided with an upstanding annular shoulder, an annulus concentric to said shoulder being mounted therein for rotation, a vertical quadrant carried by said annulus for rotation relative to said table, rectangular coordinates provided on said quadrant for projecting lines of sight upon said table, and a telescope pivotally mounted to said quadrant about a horizontal axis to produce said lines of sight.

7. A device of the character described comprising, a table adapted for horizontal positioning and providing a pair of horizontal sections pivoted at a side for vertical separation and for the accommodation therebetween of a sheet of paper or the like for charting, the upper of said sections being substantially open at the central portion thereof to expose said sheet, a member rotatably carried by said table about a vertical axis and providing a surface in a substantially vertical plane, and viewing means rotatably carried on said surface about a horizontal axis.

8. A device of the character described comprising, a table adapted for horizontal positioning and providing a pair of horizontal sections pivoted at a side for vertical separation and for the accommodation therebetween of a sheet of paper or the like for charting, the upper of said sections being substantially open at the central portion thereof to expose said sheet and defining adjacent the periphery of said table a circular seat, a circular ring rotatably mounted in said seat, a vertical quadrant fixed to said ring and rotatable therewith, and a telescope pivotally secured to said quadrant about a horizontal axis intersecting the vertical axis of said ring.

9. In a device of the character described, a table comprising an upper section and a lower section hinged at one end, said upper section defining an annular shoulder and ring means internested with said shoulder for rotation therein in the plane of said upper section.

10. In a device for determining wind direction and velocity at various elevations and adapted for use with a balloon having a known rate of ascension, a quadrant, parallel lines ruled on said quadrant and parallel lines at right angles to said first lines, spaced proportionally to the rate of ascension of said balloon, and a member mounted on said quadrant and provided with indicia for identifying certain of said lines and being adjustable relative to said quadrant and said lines.

HOWARD B. KASTER.